United States Patent
Jiang et al.

(10) Patent No.: US 11,165,251 B2
(45) Date of Patent: Nov. 2, 2021

(54) SYMMETRIC METHOD FOR OBTAINING NETWORK-POWER-LOSS COMPONENTS INDUCED BY SOURCES AND LOADS AT INDIVIDUAL BUSES IN AC POWER NETWORKS

(71) Applicant: SHENZHEN UNIVERSITY, Guangdong (CN)

(72) Inventors: Hui Jiang, Guangdong (CN); Jianchun Peng, Guangdong (CN); Yitao Liu, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 162 days.

(21) Appl. No.: 16/630,253

(22) PCT Filed: Jan. 28, 2019

(86) PCT No.: PCT/CN2019/073440
§ 371 (c)(1),
(2) Date: Jan. 10, 2020

(87) PCT Pub. No.: WO2020/154847
PCT Pub. Date: Aug. 6, 2020

(65) Prior Publication Data
US 2021/0226446 A1    Jul. 22, 2021

(51) Int. Cl.
*H02J 3/00* (2006.01)

(52) U.S. Cl.
CPC .............. *H02J 3/007* (2020.01); *H02J 3/001* (2020.01)

(58) Field of Classification Search
CPC .................................. H02J 3/001; H02J 3/007
(Continued)

(56) References Cited

U.S. PATENT DOCUMENTS

| | | |
|---|---|---|
| 9,774,188 B2 | 9/2017 | Peng et al. |
| 2009/0008993 A1 | 1/2009 | Rozman et al. |
| 2016/0301209 A1 | 10/2016 | Peng et al. |

FOREIGN PATENT DOCUMENTS

| | | |
|---|---|---|
| CN | 102403724 A | 4/2012 |
| CN | 103956733 A | 7/2014 |

(Continued)

OTHER PUBLICATIONS

International Search Report (in Chinese) and Written Opinion (in Chinese) issued in PCT/CN2019/073440, dated Oct. 29, 2019; ISA/CN.

*Primary Examiner* — Daniel Cavallari
*Assistant Examiner* — Dru Parries
(74) *Attorney, Agent, or Firm* — Harness, Dickey & Pierce, P.L.C.

(57) ABSTRACT

A symmetric method for obtaining network-power-loss components induced by sources and loads at individual buses in AC power networks is invented. Two linear expressions of bus injection active and reactive powers in terms of translation voltages and voltage angles of all buses are established at first. Then a linear symmetric matrix-equation model for the steady state of the network is built. Manipulating this model by Moore-Penrose pseudoinverse produces a linear symmetric matrix expression of translation voltages and voltage angles of all buses in terms of bus injection powers. Expressing the network power loss in terms of source's and load's powers by this matrix expression, a symmetric algebraic calculation formula for obtaining the network-power-loss components is produced after manipulating by Shapley value theorem, by which the obtaining of network-power-loss components are achieved. The set of network-power-loss components provides a new efficient tool for economic operation of AC power networks.

7 Claims, 2 Drawing Sheets

(58) Field of Classification Search
USPC .......................................................... 307/11
See application file for complete search history.

(56) References Cited

FOREIGN PATENT DOCUMENTS

| | | |
|---|---|---|
| CN | 104319772 A | 1/2015 |
| CN | 104995810 A | 10/2015 |

SYMMETRIC METHOD FOR OBTAINING NETWORK-POWER-LOSS COMPONENTS INDUCED BY SOURCES AND LOADS AT INDIVIDUAL BUSES IN AC POWER NETWORKS

TECHNICAL FIELD

The present application relates to electric power engineering field, and more particularly to a symmetric method for obtaining network-power-loss components induced by (power) sources and loads at individual buses in alternating current (AC) power networks and a computer-readable storage medium.

BACKGROUND

In the AC power network, the concise and precise relation between network power loss (the sum of line transmission losses of active power in the power network) and powers of sources and loads is a key to efficiently count the network power loss in economic load dispatch and ensure the economy of the network operation. The set of network-power-loss components induced by sources and loads at individual buses is a new concise and precise tool for efficiently expressing network power loss, thus expected to be developed urgently.

The existing methods for expressing network power loss in the AC power network dispatch fall into two categories. One expresses the network power loss using bus impedance matrix and equivalent bus injection currents of sources and loads (an equivalent bus injection current is the quotient of the conjugation of the bus injection complex power of the source and load at this bus divided by the conjugation of this bus complex voltage from the base-load flow). The other, starting from bus injection powers of the sources and loads at individual buses, derives the network power loss expression by summing line transmission losses over all lines based on DC power flow equations. The former is dependent on the base-load flow in determination of the equivalent bus injection currents of sources and loads, thus does not satisfy the requirements of dynamic change of load flow in the AC power network. The latter is unable to count the impact of reactive powers of sources and loads on network power loss due to the introduction of DC power flow equations (in which reactive powers are not considered), thus the network power loss expression varies with the reference bus (not unique). This non-uniqueness of the expression of the network power loss is conflict to the uniqueness principle in the theory of electromagnetic fields.

Therefore, the existing expressions of network power loss in the AC power network are either unable to accurately track the dynamic changes of the powers of sources and loads, or unable to count the impact of reactive powers and be invariant with the change of reference bus. Thus, they are expected to be improved urgently.

SUMMARY

An embodiment of the present application provides a symmetric method for obtaining network-power-loss components induced by sources and loads at individual buses in an AC power network and a computer-readable storage medium, which aims to solve the problems of being unable to accurately track the dynamic changes of the powers of sources and loads, and unable to count the impact of reactive powers and be invariant with the change of reference bus in the existing expressions of network power loss in the AC power network.

A first aspect of the embodiment of the present application provides a symmetric method for obtaining network-power-loss components induced by sources and loads at individual buses in an AC power network, which comprises the following steps:

establishing two linear expressions of bus injection active and reactive powers of sources and loads in terms of translation voltages and voltage angles of all buses according to bus injection powers of sources and loads and branch admittances in the AC power network;

establishing a linear symmetric matrix-equation model for the steady state of the AC power network according to the two linear expressions of bus injection active and reactive powers of sources and loads in terms of translation voltages and voltage angles of all buses;

establishing a linear symmetric matrix expression of translation voltages and voltage angles of all buses in terms of bus injection active and reactive powers of all sources and loads according to the linear symmetric matrix-equation model for the steady state of the AC power network by using the Moore-Penrose pseudoinverse of a matrix;

establishing a symmetric algebraic expression of the network power loss in terms of bus injection active and reactive powers of all sources and loads according to the linear symmetric matrix expression of translation voltages and voltage angles of all buses in terms of bus injection active and reactive powers of all sources and loads; and establishing a symmetric algebraic calculation formula for obtaining the network-power-loss components induced by sources and loads at individual buses according to the symmetric algebraic expression of the network power loss in terms of bus injection active and reactive powers of all sources and loads by using the Shapley value theorem.

A second aspect of the embodiment of the present application provides a computer-readable storage medium on which a computer program is stored. The computer program can carry out the steps of the above symmetric method for obtaining the network-power-loss components induced by sources and loads at individual buses in the AC power network when implemented by a processor.

During the implementation of the above symmetric method, the symmetric algebraic calculation formula for obtaining the network-power-loss components induced by sources and loads at individual buses is established according to the symmetric algebraic expression of the network power loss in terms of bus injection active and reactive powers of all sources and loads by using the Shapley value theorem, by which the obtaining of the network-power-loss components induced by sources and loads at individual buses in the AC power network is achieved. On the one hand, since the symmetric algebraic calculation formula for obtaining the network-power-loss components induced by sources and loads at individual buses is applicable to all bus injection powers (including active and reactive powers) of sources and loads in the AC power network, and all bus injection powers of sources and loads are identically treated in it, thereby the set of network-power-loss components induced by sources and loads at individual buses are symmetric and unique for all sources and loads. On the other hand, as the symmetric algebraic calculation formula for obtaining the network-power-loss components induced by sources and loads at individual buses is in terms of the global (not incremental) variables representing the bus injection powers of sources and loads, it is thus accurate for wide range change of the bus injection powers of sources and loads. Consequently, the symmetric algebraic calculation formula for obtaining the network-power-loss components induced by sources and loads at individual buses solves the problems of being unable to accurately track the dynamic changes of the powers of sources and loads, unable to count the impact of reactive powers and unable to be invariant with the change of reference bus in the existing methods for expressing network power loss in the AC power network dispatch.

BRIEF DESCRIPTION OF THE DRAWINGS

In order to explain the technical solution of embodiments of the present application more clearly, the drawings used in the description of the embodiments will be briefly described hereinbelow. Obviously, the drawings in the following description are some embodiments of the present application, and for persons skilled in the art, other drawings may also be obtained on the basis of these drawings without any creative work.

DETAILED DESCRIPTION OF THE EMBODIMENTS

In the description hereinbelow, for purposes of explanation rather than limitation, specific details such as specific systematic architectures and techniques are set forth in order to provide a thorough understanding of the embodiments of the present application. However, it will be apparent to persons skilled in the art that the present application may also be implemented in absence of such specific details in other embodiments. In other instances, detailed descriptions of well-known systems, devices, circuits and methods are omitted so as not to obscure the description of the present application with unnecessary detail.

Technical solution of the present application is explained hereinbelow by particular embodiments.

Figure 1:
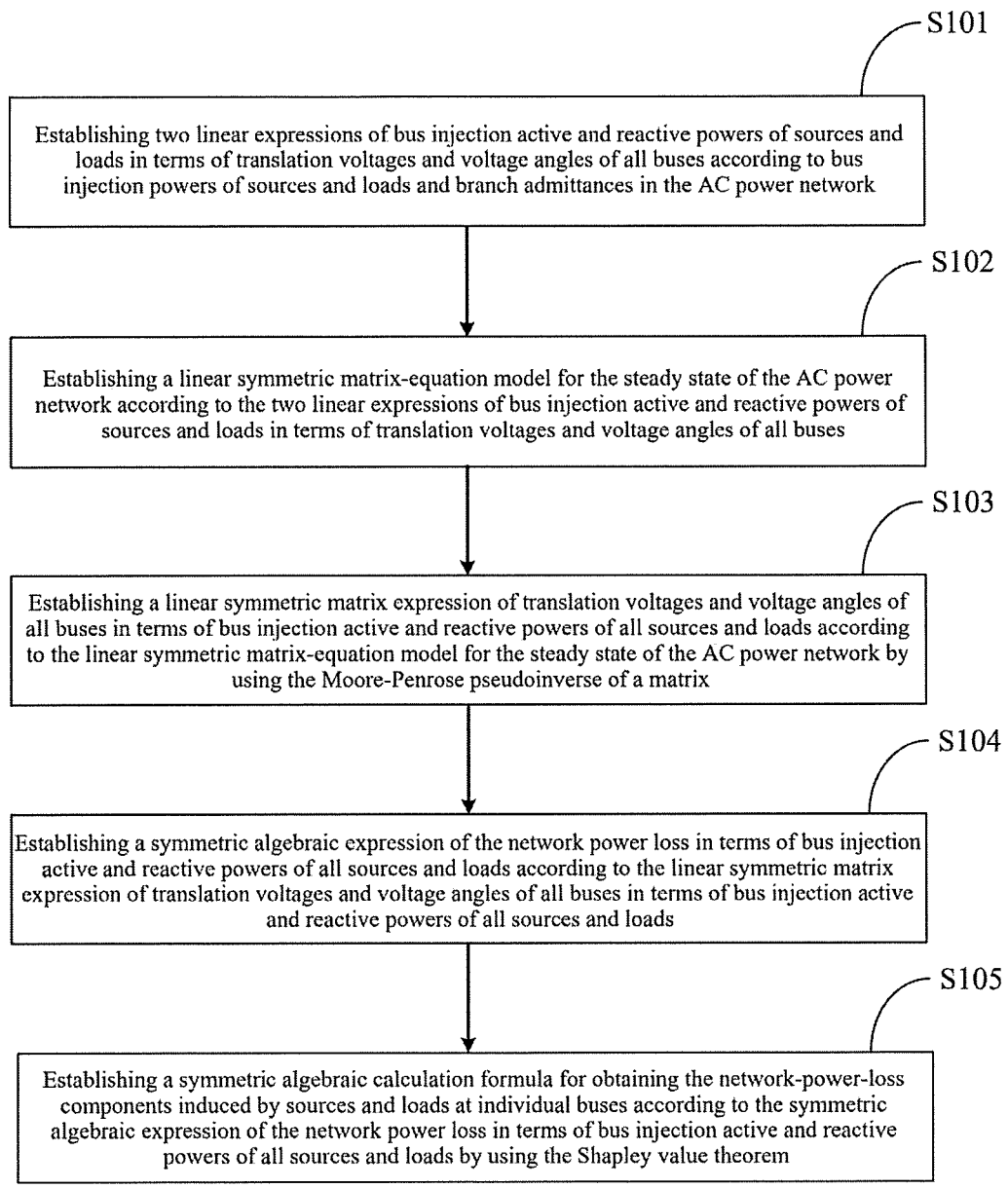
FIG. 1 is an implementation flow chart of a symmetric method for obtaining the network-power-loss components induced by sources and loads at individual buses in the AC power network in accordance with an embodiment of the present application.
Figure 2:
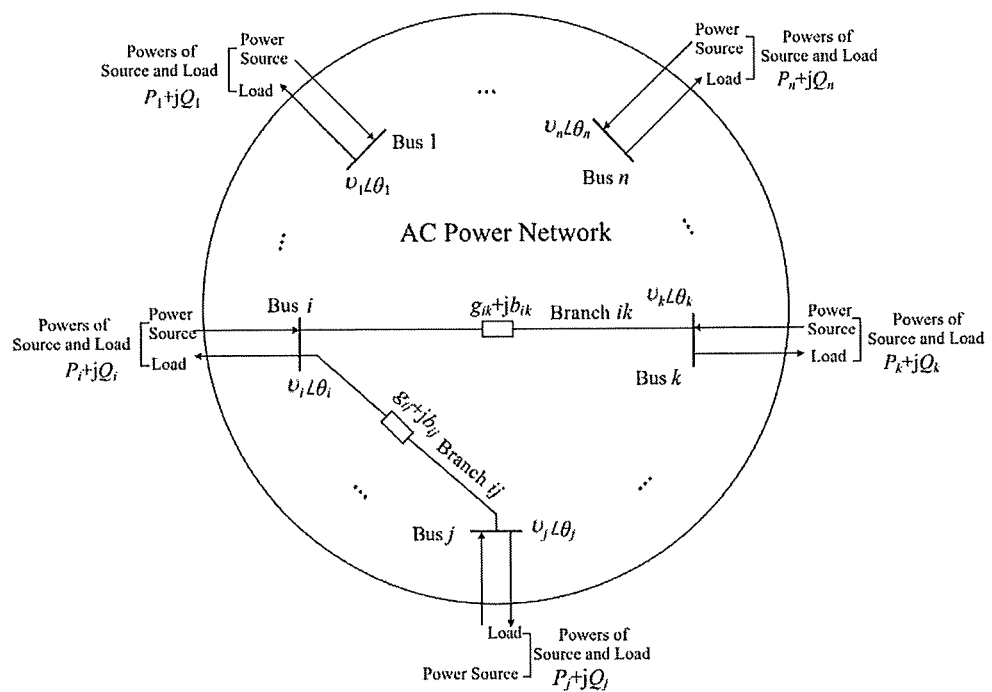
FIG. 2 is a structural schematic diagram of a universal mode of an AC power network in accordance with an embodiment of the present application.

Please refer to FIG. 1 and FIG. 2, the symmetric method for obtaining the network-power-loss components induced by sources and loads at individual buses in the AC power networks may be conducted according to the following steps:

in step S101, two linear expressions of bus injection active and reactive powers of sources and loads in terms of translation voltages and voltage angles of all buses is established according to bus injection powers of sources and loads and branch admittances in the AC power network;

in step S102, a linear symmetric matrix-equation model for the steady state of the AC power network is established according to the two linear expressions of bus injection active and reactive powers of sources and loads in terms of translation voltages and voltage angles of all buses;

in step S103, a linear symmetric matrix expression of translation voltages and voltage angles of all buses in terms of bus injection active and reactive powers of all sources and loads is established according to the linear symmetric matrix-equation model for the steady state of the AC power network by using the Moore-Penrose pseudoinverse of a matrix;

in step S104, a symmetric algebraic expression of the network power loss in terms of bus injection active and reactive powers of all sources and loads is established according to the linear symmetric matrix expression of translation voltages and voltage angles of all buses in terms of bus injection active and reactive powers of all sources and loads; and in step S105, a symmetric algebraic calculation formula for obtaining the network-power-loss components induced by sources and loads at individual buses is established according to the symmetric algebraic expression of the network power loss in terms of bus injection active and reactive powers of all sources and loads by using the Shapley value theorem.

Calculating using the above symmetric algebraic calculation formula for all bus injection powers of the sources and loads at individual buses in the AC power network will produce a set of network-power-loss components induced by sources and loads at individual buses, thereby the network-power-loss components induced by sources and loads at individual buses in the AC power network are obtained. The set of network-power-loss components induced by sources and loads at individual buses obtained by this method is not only symmetric and unique for all sources and loads, but accurate for wide range change of the bus injection powers of sources and loads. Consequently, the symmetric algebraic calculation formula for obtaining the network-power-loss components induced by sources and loads at individual buses solves the problems of being unable to accurately track the dynamic changes of the powers of sources and loads, unable to count the impact of reactive powers and unable to be invariant with the change of reference bus in the existing methods for expressing network power loss in the AC power network dispatch.

The step S101 of establishing two linear expressions of bus injection active and reactive powers of sources and loads in terms of translation voltages and voltage angles of all buses according to bus injection powers of sources and loads and branch admittances in the AC power network is specifically as follows:

the two linear expressions of bus injection active and reactive powers of sources and loads in terms of translation voltages and voltage angles of all buses are established by the following equations:

$$P_i = \sum_{k=1,k\neq i}^{n} (-\theta_i b_{ik} + v_i g_{ik} + \theta_k b_{ik} - v_k g_{ik})$$

$$Q_i = \sum_{k=1,k\neq i}^{n} (-\theta_i g_{ik} - v_i b_{ik} + \theta_k g_{ik} - v_k b_{ik})$$

in which, both i and k denote serial numbers of buses in the AC power network and belong to the set of continuous natural numbers, namely belong to $\{1,2,\ldots,n\}$; n denotes the total number of buses in the AC power network; $P_i$ and $Q_i$ denote the active and reactive powers of the source and load at bus i, respectively, and referred to collectively as the powers of the source and load at bus i; the $P_i$ equals to the active power of the power source minus the active power of the load at bus i; the $Q_i$ equals to the reactive power of the power source minus the reactive power of the load at bus i;

$g_{ik}$ and $b_{ik}$ denote the conductance and susceptance of branch ik connected between bus i and bus k, respectively, and referred to collectively as the admittance of branch ik; $\theta_i$ and $\theta_k$ denote the voltage angles at bus i and bus k, respectively; $\upsilon_i$ and $\upsilon_k$ denote the translation voltages at bus i and bus k, respectively, and both the $\upsilon_i$ and $\upsilon_k$ are per-unit voltages translated by −1.0.

The step S102 of establishing the linear symmetric matrix-equation model for the steady state of the AC power network according to the two linear expressions of bus injection active and reactive powers of sources and loads in terms of translation voltages and voltage angles of all buses is specifically as follows:

the linear symmetric matrix-equation model for the steady state of the AC power network is established by the following equation:

$$[P_1 Q_1 \ldots P_i Q_i \ldots P_n Q_n]^T = (G_{*,*})[\theta_1 \upsilon_1 \ldots \theta_i \upsilon_i \ldots \theta_n \upsilon_n]^T$$

where $(G_{*,*})$ is set to zero at first, and then the branches are scanned and the accumulations are done as follows: $G_{2i-1,2i-1} = G_{2i-1,2i-1} - b_{ij}$, $G_{2i-1,2i} = G_{2i-1,2i} + g_{ij}$, $G_{2i-1,2j-1} = G_{2i-1,2j-1} + b_{ij}$, $G_{2i-1,2j} = G_{2i-1,2j} - g_{ij}$, $G_{2i,2i-1} = G_{2i,2i-1} - g_{ij}$, $G_{2i,2i} = G_{2i,2i} - b_{ij}$, $G_{2i,2j-1} = G_{2i,2j-1} + g_{ij}$, $G_{2i,2j} = G_{2i,2j} + b_{ij}$.

In which, both i and j denote serial numbers of buses in the AC power network and belong to the set of continuous natural numbers, namely belong to $\{1,2,\ldots,n\}$; n denotes the total number of buses in the AC power network; $P_1$ and $Q_1$ denote the active and reactive powers of the source and load at bus 1, respectively, and referred to collectively as the powers of the source and load at bus 1; the $P_1$ equals to the active power of the power source minus the active power of the load at bus 1; the $Q_1$ equals to the reactive power of the power source minus the reactive power of the load at bus 1; $P_i$ and $Q_i$ denote the active and reactive powers of the source and load at bus i, respectively, and referred to collectively as the powers of the source and load at bus i; the $P_i$ equals to the active power of the power source minus the active power of the load at bus i; the $Q_i$ equals to the reactive power of the power source minus the reactive power of the load at bus i; $P_n$ and $Q_n$ denote the active and reactive powers of the source and load at bus n, respectively, and referred to collectively as the powers of the source and load at bus n; the $P_n$ equals to the active power of the power source minus the active power of the load at bus n; the $Q_n$ equals to the reactive power of the power source minus the reactive power of the load at bus n; $g_{ij}$ and $b_{ij}$ denote the conductance and susceptance of branch ij connected between bus i and bus j, and referred to collectively as the admittance of branch ij; $\theta_1$, $\theta_i$ and $\theta_n$ denote the voltage angles at bus 1, bus i and bus n, respectively; $\upsilon_1$, $\upsilon_i$ and $\upsilon_n$ denote the translation voltages at bus 1, bus i and bus n, respectively, and all $\upsilon_1$, $\upsilon_i$ and $\upsilon_n$ are per-unit voltages translated by −1.0; $(G_{*,*})$ is the full bus admittance matrix with a dimension of $2n \times 2n$; $G_{2i-1,2i-1}$, $G_{2i-1,2i}$, $G_{2i-1,2j-1}$, $G_{2i-1,2j}$, $G_{2i,2i-1}$, $G_{2i,2i}$, $G_{2i,2j-1}$ and $G_{2i,2j}$ are the row-2i−1 and column-2i−1, the row-2i−1 and column-2i, the row-2i−1 and column-2j−1, the row-2i−1 and column-2j, the row-2i and column-2i−1, the row-2i and column-2i, the row-2i and column-2j−1 and the row-2i and column-2j elements of the full bus admittance matrix, respectively.

In the above matrix-equation model for the steady state of the AC power network, all bus injection powers of the sources and loads at individual buses are introduced and identically treated without any bias, namely symmetrically treated. This is the reason why the above model is called the linear symmetric matrix-equation model.

The step S103 of establishing the linear symmetric matrix expression of translation voltages and voltage angles of all buses in terms of bus injection active and reactive powers of all sources and loads according to the linear symmetric matrix-equation model for the steady state of the AC power network by using the Moore-Penrose pseudoinverse of a matrix is specifically as follows:

the linear symmetric matrix expression of translation voltages and voltage angles of all buses in terms of bus injection active and reactive powers of all sources and loads is established by the following equations:

$$[\theta_1 \upsilon_1 \ldots \theta_i \upsilon_i \ldots \theta_n \upsilon_n]^T = (\alpha_{*,*})[P_1 Q_1 \ldots P_i Q_i \ldots P_n Q_n]^T$$

$$(\alpha_{*,*}) = (G_{*,*})^+$$

in which, i denotes the serial number of a bus in the AC power network and belongs to the set of continuous natural numbers, namely belong to $\{1,2,\ldots,n\}$; n denotes the total number of buses in the AC power network; $\theta_1$, $\theta_i$ and $\theta_n$ denote the voltage angles at bus 1, bus i and bus n, respectively; $\upsilon_1$, $\upsilon_i$ and $\upsilon_n$ denote the translation voltages at bus 1, bus i and bus n, respectively, and the $\upsilon_1$, $\upsilon_i$ and $\upsilon_n$ are all per-unit voltages translated by −1.0; $P_1$ and $Q_1$ denote the active and reactive powers of the source and load at bus 1, respectively, and referred to collectively as the powers of the source and load at bus 1; the $P_1$ equals to the active power of the power source minus the active power of the load at bus 1; the $Q_1$ equals to the reactive power of the power source minus the reactive power of the load at bus 1; $P_i$ and $Q_i$ denote the active and reactive powers of the source and load at bus i, respectively, and referred to collectively as the powers of the source and load at bus i; the $P_i$ equals to the active power of the power source minus the active power of the load at bus i; the $Q_i$ equals to the reactive power of the power source minus the reactive power of the load at bus i; $P_n$ and $Q_n$ denote the active and reactive powers of the source and load at bus n, respectively, and referred to collectively as the powers of the source and load at bus n; the $P_n$ equals to the active power of the power source minus the active power of the load at bus n; the $Q_n$ equals to the reactive power of the power source minus the reactive power of the load at bus n; $(G_{*,*})$ is the full bus admittance matrix with a dimension of $2n \times 2n$; the superscript symbol + is an operator to find the Moore-Penrose pseudoinverse of a matrix; and $(\alpha_{*,*})$ is the Moore-Penrose pseudoinverse of the full bus admittance matrix $(G_{*,*})$.

The step S104 of establishing the symmetric algebraic expression of the network power loss in terms of bus injection active and reactive powers of all sources and loads according to the linear symmetric matrix expression of translation voltages and voltage angles of all buses in terms of bus injection active and reactive powers of all sources and loads is specifically as follows:

based on the general knowledge of network power loss: $P_L = \sum_{ik \in \Omega} g_{ik}[(\theta_i - \theta_k)^2 + (\upsilon_i - \upsilon_k)^2]$, the symmetric algebraic expression of the network power loss in terms of bus injection active and reactive powers of all sources and loads is established by the following equation:

$$P_L = \sum_{ik \in \Omega} g_{ik}$$

-continued $$\left\{ \begin{array}{l} \left[\sum_{h=1}^{n}((a_{2i-1,2h-1}-a_{2k-1,2h-1})P_h+(a_{2i-1,2h}-a_{2k-1,2h})Q_h)\right]^2 + \\ \left[\sum_{h=1}^{n}((a_{2i,2h-1}-a_{2k,2h-1})P_h+(a_{2i,2h}-a_{2k,2h})Q_h)\right]^2 \end{array} \right\}$$

in which, i, k and h denote serial numbers of buses in the AC power network and belong to the set of continuous natural numbers, namely belong to $\{1,2,\ldots,n\}$; n denotes the total number of buses in the AC power network; ik denotes the branch connected between bus i and bus k; $\Omega$ denotes the set of all branches in the AC power network; $g_{ik}$ and $b_{ik}$ denote the conductance and susceptance of branch ik connected between bus i and bus k, and referred to collectively as the admittance of branch ik; $P_L$ is the network power loss in the AC power network; $\alpha_{2i-1,2h-1}$, $\alpha_{2k-1,2h-1}$, $\alpha_{2i-1,2h}$, $\alpha_{2k-1,2h}$, $\alpha_{2i,2h-1}$, $\alpha_{2k,2h-1}$, $\alpha_{2i,2h}$ and $\alpha_{2k,2h}$ are the row-2i-1 and column-2h-1, the row-2k-1 and column-2h-1, the row-2i-1 and column-2h, the row-2k-1 and column-2h, the row-2i and column-2h-1, the row-2k and column-2h-1, the row-2i and column-2h and the row-2k and column-2h elements of the Moore-Penrose pseudoinverse of the full bus admittance matrix with a dimension of 2n×2n, respectively; $P_h$ and $Q_h$ denote the active and reactive powers of the source and load at bus h, respectively, and referred to collectively as the powers of the source and load at bus h; the $P_h$ equals to the active power of the power source minus the active power of the load at bus h; the $Q_h$ equals to the reactive power of the power source minus the reactive power of the load at bus h.

The step S105 of establishing the symmetric algebraic calculation formula for obtaining the network-power-loss components induced by sources and loads at individual buses according to the symmetric algebraic expression of the network power loss in terms of bus injection active and reactive powers of all sources and loads by using the Shapley value theorem is specifically as follows:

the symmetric algebraic calculation formula for obtaining the network-power-loss components induced by sources and loads at individual buses is established by the following equation:

$$P_{Lj} = \sum_{ik \in \Omega} g_{ik}$$

$$\left\{ \begin{array}{l} \left[\sum_{h=1}^{n}((a_{2i-1,2h-1}-a_{2k-1,2h-1})P_h+(a_{2i-1,2h}-a_{2k-1,2h})Q_h)\right] \times \\ ((a_{2i-1,2j-1}-a_{2k-1,2j-1})P_j+(a_{2i-1,2j}-a_{2k-1,2j})Q_j) + \\ \left[\sum_{h=1}^{n}((a_{2i,2h-1}-a_{2k,2h-1})P_h+(a_{2i,2h}-a_{2k,2h})Q_h)\right] \times \\ ((a_{2i,2j-1}-a_{2k,2j-1})P_j+(a_{2i,2j}-a_{2k,2j})Q_j) \end{array} \right\}$$

in which, i, j, k and h denote serial numbers of buses in the AC power network and belong to the set of continuous natural numbers, namely belong to $\{1,2,\ldots,n\}$; n denotes the total number of buses in the AC power network; ik denotes the branch connected between bus i and bus k; $\Omega$ denotes the set of all branches in the AC power network; $P_{Lj}$ is the network-power-loss component induced by the source and load at bus j in the AC power network; $g_{ik}$ and $b_{ik}$ denote the conductance and susceptance of branch ik connected between bus i and bus k, and referred to collectively as the admittance of branch ik; $\alpha_{2i-1,2h-1}$, $\alpha_{2k-1,2h-1}$, $\alpha_{2i-1,2h}$, $\alpha_{2k-1,2h}$, $\alpha_{2i,2h-1}$, $\alpha_{2k,2h-1}$, $\alpha_{2i,2h}$ and $\alpha_{2k,2h}$, $\alpha_{2i-1,2j-1}$, $\alpha_{2k-1,2j-1}$, $\alpha_{2i-1,2j}$, $\alpha_{2k-1,2j}$, $\alpha_{2i,2j-1}$, $\alpha_{2k,2j-1}$, $\alpha_{2i,2j}$ and $\alpha_{2k,2j}$ are the row-2i-1 and column-2h-1, the row-2k-1 and column-2h-1, the row-2i-1 and column-2h, the row-2k-1 and column-2h, the row-2i and column-2h-1, the row-2k and column-2h-1, the row-2i and column-2h, the row-2k and column-2h, the row-2i-1 and column-2j-1, the row-2k-1 and column-2j-1, the row-2i-1 and column-2j, the row-2k-1 and column-2j, the row-2i and column-2j-1, the row-2k and column-2j-1, the row-2i and column-2j and the row-2k and column-2j elements of the Moore-Penrose pseudoinverse of the full bus admittance matrix with a dimension of 2n×2n, respectively; $P_h$ and $Q_h$ denote the active and reactive powers of the source and load at bus h, respectively, and referred to collectively as the powers of the source and load at bus h; the $P_h$ equals to the active power of the power source minus the active power of the load at bus h; the $Q_h$ equals to the reactive power of the power source minus the reactive power of the load at bus h; $P_j$ and $Q_j$ denote the active and reactive powers of the source and load at bus j, respectively, and referred to collectively as the powers of the source and load at bus j; the $P_j$ equals to the active power of the power source minus the active power of the load at bus j; the $Q_j$ equals to the reactive power of the power source minus the reactive power of the load at bus j.

The above symmetric algebraic calculation formula for obtaining the network-power-loss components induced by sources and loads at individual buses is applicable to all bus injection powers of sources and loads in the AC power network, and all bus injection powers of sources and loads are identically treated in it. This is the reason why the present application is called a symmetric method for obtaining network-power-loss components induced by sources and loads at individual buses in the AC power network. Moreover, as this symmetric algebraic calculation formula is in terms of the global (not incremental) variables representing the bus injection powers of sources and loads, it is thus accurate for wide range change of the bus injection powers of sources and loads. This symmetric and accurate relation between the network-power-loss components and the bus injection powers of sources and loads solves the problems of being unable to accurately track the dynamic changes of the powers of sources and loads, unable to count the impact of reactive powers and unable to be invariant with the change of reference bus in the existing methods for expressing network power loss in the AC power network dispatch.

An embodiment of the present application provides a computer-readable storage medium on which a computer program is stored. The computer program may be a source code program, an object code program, an executable file or some intermediate form. The computer program can carry out the steps of the symmetric method for obtaining the network-power-loss components of sources and loads in the AC power networks as described in the above embodiments when implemented by a processor. The computer-readable storage medium may include any entity or device capable of carrying computer programs, such as a U disk, a mobile hard disk, an optical disk, a computer memory, a random-access memory and the like.

The embodiments disclosed herein are merely used to illustrate the technical solutions of the present application, but not aimed to limit the present application. Although the present application is described in detail with reference to the foregoing embodiments, it should be understood for persons skilled in the art that modifications, or equivalent replacements of some of the technical features can be implemented under the spirit of the present application, and these modifications or replacements do not deviate the essence of the corresponding technical solutions from the spirit and scope of the technical solutions of the embodiments of the present application, and should be included by the protection scope of the present application.

What is claimed is:

1. A symmetric method for obtaining network-power-loss components induced by sources and loads at individual buses in an AC power network, comprising the following steps:
    establishing two linear expressions of bus injection active and reactive powers of sources and loads in terms of translation voltages and voltage angles of all buses according to bus injection powers of sources and loads and branch admittances in the AC power network;
    establishing a linear symmetric matrix-equation model for the steady state of the AC power network according to the two linear expressions of bus injection active and reactive powers of sources and loads in terms of translation voltages and voltage angles of all buses;
    establishing a linear symmetric matrix expression of translation voltages and voltage angles of all buses in terms of bus injection active and reactive powers of all sources and loads according to the linear symmetric matrix-equation model for the steady state of the AC power network by using the Moore-Penrose pseudoinverse of a matrix;
    establishing a symmetric algebraic expression of the network power loss in terms of bus injection active and reactive powers of all sources and loads according to the linear symmetric matrix expression of translation voltages and voltage angles of all buses in terms of bus injection active and reactive powers of all sources and loads; and
    establishing a symmetric algebraic calculation formula for obtaining the network-power-loss components induced by sources and loads at individual buses according to the symmetric algebraic expression of the network power loss in terms of bus injection active and reactive powers of all sources and loads by using the Shapley value theorem.

2. The symmetric method according to claim 1, wherein the step of establishing two linear expressions of bus injection active and reactive powers of sources and loads in terms of translation voltages and voltage angles of all buses according to bus injection powers of sources and loads and branch admittances in the AC power network comprises:
    establishing the two linear expressions of bus injection active and reactive powers of sources and loads in terms of translation voltages and voltage angles of all buses by the following equations:

$$P_i = \sum_{k=1, k \neq i}^{n} (-\theta_i b_{ik} + v_i g_{ik} + \theta_k b_{ik} - v_k g_{ik})$$

$$Q_i = \sum_{k=1, k \neq i}^{n} (-\theta_i g_{ik} - v_i b_{ik} + \theta_k g_{ik} - v_k b_{ik})$$

wherein, both i and k denote serial numbers of buses in the AC power network and belong to the set of continuous natural numbers, namely belongs to $\{1,2, \ldots, n\}$; n denotes the total number of buses in the AC power network; $P_i$ and $Q_i$ denote the active and reactive powers of the source and load at bus i, respectively, and referred to collectively as the powers of the source and load at bus i; $g_{ik}$ and $b_{ik}$ denote the conductance and susceptance of branch ik connected between bus i and bus k, respectively, and referred to collectively as the admittance of branch ik; $\theta_i$ and $\theta_k$ denote the voltage angles at bus i and bus k, respectively; and $v_i$ and $v_k$ denote the translation voltages at bus i and bus k, respectively, and both the $v_i$ and $v_k$ are per-unit voltages translated by −1.0.

3. The symmetric method according to claim 1, wherein the step of establishing the linear symmetric matrix-equation model for the steady state of the AC power network according to the two linear expressions of bus injection active and reactive powers of sources and loads in terms of translation voltages and voltage angles of all buses comprises:
    establishing the linear symmetric matrix-equation model for the steady state of the AC power network by the following equation:

$$[P_1 Q_1 \ldots P_i Q_i \ldots P_n Q_n]^T = (G_{*,*})[\theta_1 v_1 \ldots \theta_i v_i \ldots \theta_n v_n]^T$$

where $(G_{*,*})$ is set to zero at first, and then the branches are scanned and the accumulations are done as follows:
$G_{2i-1,2i-1} = G_{2i-1,2i-1} - b_{ij}$, $G_{2i-1,2i} = G_{2i-1,2i} + g_{ij}$, $G_{2i-1,2j-1} = G_{2i-1,2j-1} + b_{ij}$, $G_{2i-1,2j} = G_{2i-1,2j} - g_{ij}$, $G_{2i,2i-1} = G_{2i,2i-1} - g_{ij}$, $G_{2i,2i} = G_{2i,2i} - b_{ij}$, $G_{2i,2j-1} = G_{2i,2j-1} + g_{ij}$, $G_{2i,2j} = G_{2i,2j} + b_{ij}$; and wherein, both i and j denote serial numbers of buses in the AC power network and belong to the set of continuous natural numbers, namely belong to $\{1,2, \ldots, n\}$; n denotes the total number of buses in the AC power network; $P_1$ and $Q_1$ denote the active and reactive powers of the source and load at bus 1, respectively, and referred to collectively as the powers of the source and load at bus 1; $P_i$ and $Q_i$ denote the active and reactive powers of the source and load at bus i, respectively, and referred to collectively as the powers of the source and load at bus i; $P_n$ and $Q_n$ denote the active and reactive powers of the source and load at bus n, respectively, and referred to collectively as the powers of the source and load at bus n; $g_{ij}$ and $b_{ij}$ denote the conductance and susceptance of branch ij connected between bus i and bus j, and referred to collectively as the admittance of branch ij; $\theta_1$, $\theta_i$ and $\theta_n$ denote the voltage angles at bus 1, bus i and bus n, respectively; $v_1$, $v_i$ and $v_n$ denote the translation voltages at bus 1, bus i and bus n, respectively, and the $v_i$ and $v_i$ are all per-unit voltages translated by −1.0; $(G_{*,*})$ denotes the full bus admittance matrix with a dimension of 2n×2n; and $G_{2i-1,2i-1}$, $G_{2i-1,2i}$, $G_{2i-1,2j-1}$, $G_{2i-1,2j}$, $G_{2i,2i-1}$, $G_{2i,2i}$, $G_{2i,2j-1}$ and $G_{2i,2j}$ are elements of the full bus admittance matrix.

4. The symmetric method according to claim 1, wherein the step of establishing the linear symmetric matrix expression of translation voltages and voltage angles of all buses in terms of bus injection active and reactive powers of all sources and loads according to the linear symmetric matrix-equation model for the steady state of the AC power network by using the Moore-Penrose pseudoinverse of a matrix comprises:
    establishing the linear symmetric matrix expression of translation voltages and voltage angles of all buses in terms of bus injection active and reactive powers of all sources and loads by the following equations:

$$[\theta_1 v_1 \ldots \theta_i v_i \ldots \theta_n v_n]^T = (\alpha_{*,*})[P_1 Q_1 \ldots P_i Q_i \ldots P_n Q_n]^T$$

$$(\alpha_{*,*}) = (G_{*,*})^+$$

wherein, i denotes the serial number of a bus in the AC power network and belongs to the set of continuous natural numbers, namely belong to $\{1,2,\ldots,n\}$; n denotes the total number of buses in the AC power network; $\theta_1$, $\theta_i$ and $\theta_n$ denote the voltage angles at bus 1, bus i and bus n, respectively; $\upsilon_1$, $\upsilon_i$ and $\upsilon_n$ denote the translation voltages at bus 1, bus i and bus n, respectively, and the $\upsilon_1$, $\upsilon_i$ and $\upsilon_n$ are all per-unit voltages translated by $-1.0$; $P_1$ and $Q_1$ denote the active and reactive powers of the source and load at bus 1, respectively, and referred to collectively as the powers of the source and load at bus 1; $P_i$ and $Q_i$ denote the active and reactive powers of the source and load at bus i, respectively, and referred to collectively as the powers of the source and load at bus i; $P_n$ and $Q_n$ denote the active and reactive powers of the source and load at bus n, respectively, and referred to collectively as the powers of the source and load at bus n; $(G_{*,*})$ is the full bus admittance matrix with a dimension of $2n\times2n$; the superscript symbol $+$ is an operator to find the Moore-Penrose pseudoinverse of a matrix; and $(\alpha_{*,*})$ denotes the Moore-Penrose pseudoinverse of the full bus admittance matrix $(G_{*,*})$.

5. The symmetric method according to claim 1, wherein the step of establishing the symmetric algebraic expression of the network power loss in terms of bus injection active and reactive powers of all sources and loads according to the linear symmetric matrix expression of translation voltages and voltage angles of all buses in terms of bus injection active and reactive powers of all sources and loads comprises:

based on the general knowledge of network power loss: $P_L = \Sigma_{ik\in\Omega} g_{ik}[(\theta_i-\theta_k)^2+(\upsilon_i-\upsilon_k)^2]$, establishing the symmetric algebraic expression of the network power loss in terms of bus injection active and reactive powers of all sources and loads by the following equation:

$$P_L = \sum_{ik\in\Omega} g_{ik} \left\{ \begin{array}{l} \left[\sum_{h=1}^{n}((a_{2i-1,2h-1}-a_{2k-1,2h-1})P_h+(a_{2i-1,2h}-a_{2k-1,2h})Q_h)\right]^2 + \\ \left[\sum_{h=1}^{n}((a_{2i,2h-1}-a_{2k,2h-1})P_h+(a_{2i,2h}-a_{2k,2h})Q_h)\right]^2 \end{array} \right\}$$

wherein, i, k and h denote serial numbers of buses in the AC power network and belong to the set of continuous natural numbers, namely belong to $\{1,2,\ldots,n\}$; n denotes the total number of buses in the AC power network; ik denotes the branch connected between bus i and bus k; $\Omega$ denotes the set of all branches in the AC power network; $g_{ik}$ and $b_{ik}$ denote the conductance and susceptance of branch ik connected between bus i and bus k, and referred to collectively as the admittance of branch ik; $P_L$ is the network power loss in the AC power network; $\alpha_{2i-1,2h-1}$, $\alpha_{2k-1,2h-1}$, $\alpha_{2i-1,2h}$, $\alpha_{2k-1,2h}$, $\alpha_{2i,2h-1}$, $\alpha_{2k,2h-1}$, $\alpha_{2i,2h}$ and $\alpha_{2k,2h}$ are elements of the Moore-Penrose pseudoinverse of the full bus admittance matrix with a dimension of $2n\times2n$; $P_h$ and $Q_h$ denote the active and reactive powers of the source and load at bus h, respectively, and referred to collectively as the powers of the source and load at bus h.

6. The symmetric method according to claim 1, wherein the step of establishing the symmetric algebraic calculation formula for obtaining the network-power-loss components induced by sources and loads at individual buses according to the symmetric algebraic expression of the network power loss in terms of bus injection active and reactive powers of all sources and loads by using the Shapley value theorem comprises:

establishing the symmetric algebraic calculation formula for obtaining the network-power-loss components induced by sources and loads at individual buses by the following equation:

$$P_{Lj} = \sum_{ik\in\Omega} g_{ik}$$

$$\left\{ \begin{array}{l} \left[\sum_{h=1}^{n}((a_{2i-1,2h-1}-a_{2k-1,2h-1})P_h+(a_{2i-1,2h}-a_{2k-1,2h})Q_h)\right] \times \\ ((a_{2i-1,2j-1}-a_{2k-1,2j-1})P_j+(a_{2i-1,2j}-a_{2k-1,2j})Q_j) + \\ \left[\sum_{h=1}^{n}((a_{2i,2h-1}-a_{2k,2h-1})P_h+(a_{2i,2h}-a_{2k,2h})Q_h)\right] \times \\ ((a_{2i,2j-1}-a_{2k,2j-1})P_j+(a_{2i,2j}-a_{2k,2j})Q_j) \end{array} \right\}$$

wherein i, j, k and h denote serial numbers of buses in the AC power network and belong to the set of continuous natural numbers, namely belong to $\{1,2,\ldots,n\}$; n denotes the total number of buses in the AC power network; ik denotes the branch connected between bus i and bus k; $\Omega$ denotes the set of all branches in the AC power network; $P_{Lj}$ is the network-power-loss component induced by the source and load at bus j in the AC power network;

$g_{ik}$ and $b_{ik}$ denote the conductance and susceptance of branch ik connected between bus i and bus k, and referred to collectively as the admittance of branch ik; $\alpha_{2i-1,2h-1}$, $\alpha_{2k-1,2h-1}$, $\alpha_{2i-1,2h}$, $\alpha_{2k-1,2h}$, $\alpha_{2i,2h-1}$, $\alpha_{2k,2h-1}$, $\alpha_{2i,2h}$ and $\alpha_{2k,2h}$, $\alpha_{2i-1,2j-1}$, $\alpha_{2k-1,2j-1}$, $\alpha_{2i-1,2j}$, $\alpha_{2k-1,2j}$, $\alpha_{2i,2j-1}$, $\alpha_{2k,2j-1}$, $\alpha_{2i,2j}$ and $\alpha_{2k,2j}$ and $a_{2k,2j}$ are elements of the Moore-Penrose pseudoinverse of the full bus admittance matrix with a dimension of $2n\times2n$; $P_h$ and $Q_h$ the active and reactive powers of the source and load at bus h, respectively, and referred to collectively as the powers of the source and load at bus h; $P_j$ and $Q_h$ denote the active and reactive powers of the source and load at bus j, respectively, and referred to collectively as the powers of the source and load at bus j.

7. A computer readable storage medium on which a computer program is stored, wherein the computer program can carry out the steps of the symmetric method for obtaining the network-power-loss components induced by sources and loads at individual buses in the AC power network according to claim 1 when implemented by a processor.

* * * * *